United States Patent [19]

Aaron et al.

[11] 3,766,546

[45] Oct. 16, 1973

[54] CONVERTER FOR SEGMENT COMPANDED PCM CODES

[75] Inventors: Marvin Robert Aaron, Fair Haven, N.J.; Hisashi Kaneko, Tokyo, Japan; Paul Wray Osborne, Neptune, N.J.

[73] Assignee: Bell Telephone Laboratories, Incorporated, Murry Hill, N.J.

[22] Filed: Apr. 21, 1972

[21] Appl. No.: 246,230

[52] U.S. Cl. .......................... 340/347 DD, 235/154

[51] Int. Cl. .......................................... H04l 3/00

[58] Field of Search .............. 340/347 DD; 235/154, 235/155, 197, 92 DE; 325/38 A, 38 B; 179/15 AV, 15 BW; 441/1

[56] References Cited

UNITED STATES PATENTS

| | | | |
|---|---|---|---|
| 3,594,560 | 7/1971 | Stanley | 340/347 DD |
| 3,596,267 | 7/1971 | Goodman | 340/347 DD |
| 3,632,996 | 1/1972 | Anderson et al. | 340/347 DD |

*Primary Examiner*—Charles D. Miller
*Attorney*—W. L. Keefauver et al.

[57] ABSTRACT

Conversion of signals in one compressed segmented PCM code format to a second compressed segmented PCM format is performed directly by means of a circuit which treats the characteristic bits and the mantissa bits serially in accordance with a conversion algorithm. The characteristic bits are applied to a counter circuit whose output is used to produce a first term of the algorithm and the mantissa bits are applied to a shift register whose output is used to generate a second term of the algorithm. The first term is subtracted from the second term and the difference is used to generate the characteristic bits of the converted signal.

6 Claims, 5 Drawing Figures

FIG. 3
| $L_1$ | $L_2$ | $\zeta$ | $\eta_2$ | $U_4$ | $U_5$ | $U_6$ |
|---|---|---|---|---|---|---|
| 0 | 0 | 0 | 0 | - | - | 0 |
| 1 | 0 | 1 | 0 | - | 0 | 0 |
| ≠0 | ≠0 | 0 | 1 | - | 1 | 0 |
| ≠0 | ≠0 | 1 | 1 | 1 | 0 | 0 |
FIG. 4
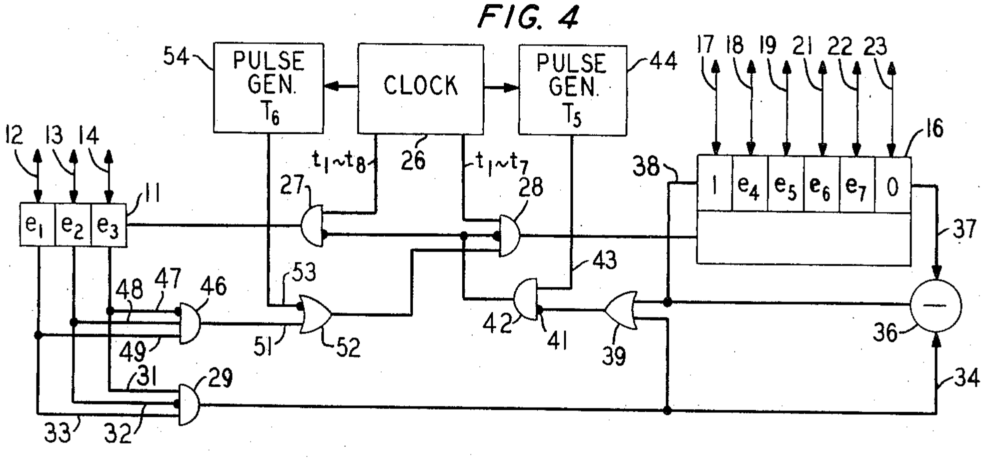
FIG. 5
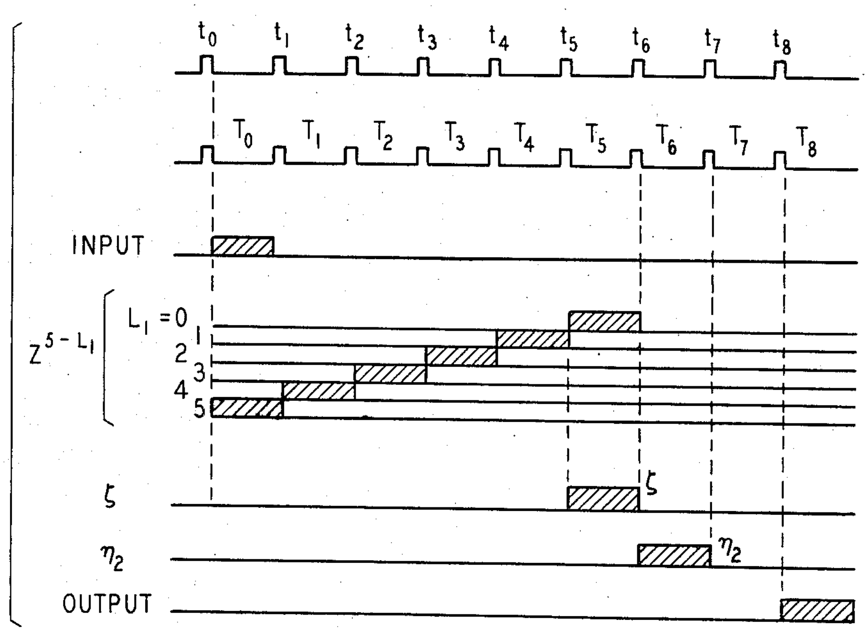

CONVERTER FOR SEGMENT COMPANDED PCM CODES

BACKGROUND OF THE INVENTION

1. Field of the Invention

This invention relates to digital signal processing and, more particularly, to the processing of nonlinear Pulse Code Modulation (PCM) signals.

PCM signals consist, in general, of a series of binary code words wherein each word represents an instantaneous value of a periodically sampled and quantized analog signal. In normal usage these code words are transmitted in the form of a serial bit stream to a receiving station where they are decoded into a reconstructed version of the original analog signal. Various operations and processing of the digital signal are preferably performed on the PCM words or bit stream directly as opposed to reconstructing the analog signal, processing it, and then re-encoding it.

Of increasing interest in the PCM field is the use of segmented companding laws, which are essentially piecewise linear approximations of smooth or continuous companding laws. The principal advantages of segmented companding, when considered in the context of solid state and integrated circuitry, are the reduction of diode tracking errors which occur in continuous companding, and the feasibility of implementation by integrated digital networks because of the linear characteristics of the segments.

At the present time there has been no world-wide standardization of segmented companding, there being several segmented companding laws, of which the two most favored are the A Law and the $\mu$ Law, where $\mu$ equals 255, specifying the degree of curvature of the companding characteristic. Obviously, unless and until standardization is achieved, in order to connect or interface with differing systems it is necessary to have, at the interface, an arrangement for converting from one segment companding law to the other.

2. Description of the Prior Art

The present state of the art calls for converting a digital signal encoded in accordance with one segmented companding law to a digital signal of a different segmented companding law by either decoding the first signal into analog form and re-encoding it into the second PCM format or linearizing it and recompressing it in the new format. Such arrangements are both cumbersome and the first introduces more distortion. Clearly an arrangement which makes the conversion directly from one segmented PCM format to the other is to be preferred.

SUMMARY OF THE INVENTION

The present invention is based upon an algorithm which defines the conversion operation for conversion directly from one segment law format to another. The invention will be described in terms of conversion from the fiteen segment $\mu$ Law to the thirteen segment A Law, but the principles set forth are adaptable for use with a large number of segmented companding formats.

The eight bit $\mu$ Law and A Law codes are characterized by the form $e_s, e_1e_2e_3e_4e_5e_6e_7$ where $e_s$ is the sign bit, $e_1e_2e_3$ define the particular segment of the code and are called characteristic bits, and $e_4e_5e_6e_7$ define the quantizing position within a segment and are called mantissa bits. As is discussed in a copending U. S. application, Ser. No. 210,795 of M. R. Aaron and H. Kaneko, filed Dec. 22, 1971, such a code can replace a 14 digit linear code, including one sign bit, with a minimal signal degradation. The $\mu$ Law and A Law codes, as will be explained more fully hereinafter, differ primarily in the segment arrangement and, hence, in the characteristic bits. Thus, to convert from one code law to the other a systematic search procedure is used to determine the proper values of the characteristic and mantissa bits.

In an illustrative embodiment of the invention for converting a signal directly from the $\mu$ Law format to the A Law format, the three characteristic bits are applied in parallel to a three place binary counter and the mantissa bits are simultaneously applied in parallel to a shift register. In addition, for reasons which will be explained hereinafter, a one is applied to the first stage of the shift register and a zero to the last stage.

Under control of a clock, the counter counts up for eight pulses, and the outputs of the three cells of the counter are applied to first and second AND gates. At a particular time during the count-up, the first AND gate, which has one inverted input, will be activated and produce an output, This output, which is one term of the conversion algorithm, is applied to one input of a subtractor circuit and to one input of a first OR gate.

At the same time that the counter is counting up, pulses from the clock are applied through a third AND gate to the shift register, causing it to shift one place with each clock pulse. The serial output of the shift register is applied to a second input of the subtractor circuit, where the signal on the first input is subtracted from it. The output of the subtractor circuit is fed back to a serial input of the shift register, and to a second input of the first OR gate.

The output of the first OR gate is applied to an inverted input of a fourth AND gate, the other input of which has a signal applied from the clock at time period $T_5$ of the counting cycle. The output of the fourth AND gate is applied to an inverted input of the third AND gate, which controls the shifting of the shift register. For reasons which will be apparent hereinafter, the shifting of the shift register is halted during the time period $T_5$ if the output of the subtractor circuit and the output of the first AND gate are both zero during this time period.

The other AND gate to which the output of the binary counter is applied has one inverted input so that it produces an output only when the output of the counter is six. This output is applied to a second OR gate. The other input to the second OR gate is inverted, and has a pulse applied thereto only during the time period $T_6$. Thus, the second OR gate produces an output at all times except when the output of the counter is some value other than six during the time period $T_6$. The output of the second OR gate is applied to an input of the third AND gate controlling the shift register. Hence, when, during the time period $T_6$ the output of the counter is other than six, the shift register is stopped for one time period.

The clock pulses which control the binary counter are applied thereto through an AND gate which has an inverted input connected to the output of the fourth AND gate. Thus, when the fourth AND gate halts the action of the shift register for one time period, it also halts the counter action for the same time period.

As will be apparent hereinafter, at time $t_8$, or time period $T_8$, the counter and shift register contain the characteristic and mantissa bits of the converted code signal, which is then extracted in parallel.

It is a feature of the present invention that the conversion of one segment companding law code to another code is performed sequentially in accordance with a conversion algorithm without the necessity of expanding and recompressing the coded signal.

BRIEF DESCRIPTION OF THE DRAWINGS

The various features of the present invention will be more apparent from the following detailed description and drawings, in which:

FIG. 3 is a logic table constructed from mathematical relationships of the algorithm of the present invention;

FIG. 4 is a block diagram of a conversion circuit according to the principles of the present invention; and FIG. 5 is a timing diagram for the circuit of FIG. 4.

DETAILED DESCRIPTION

Figure 2:
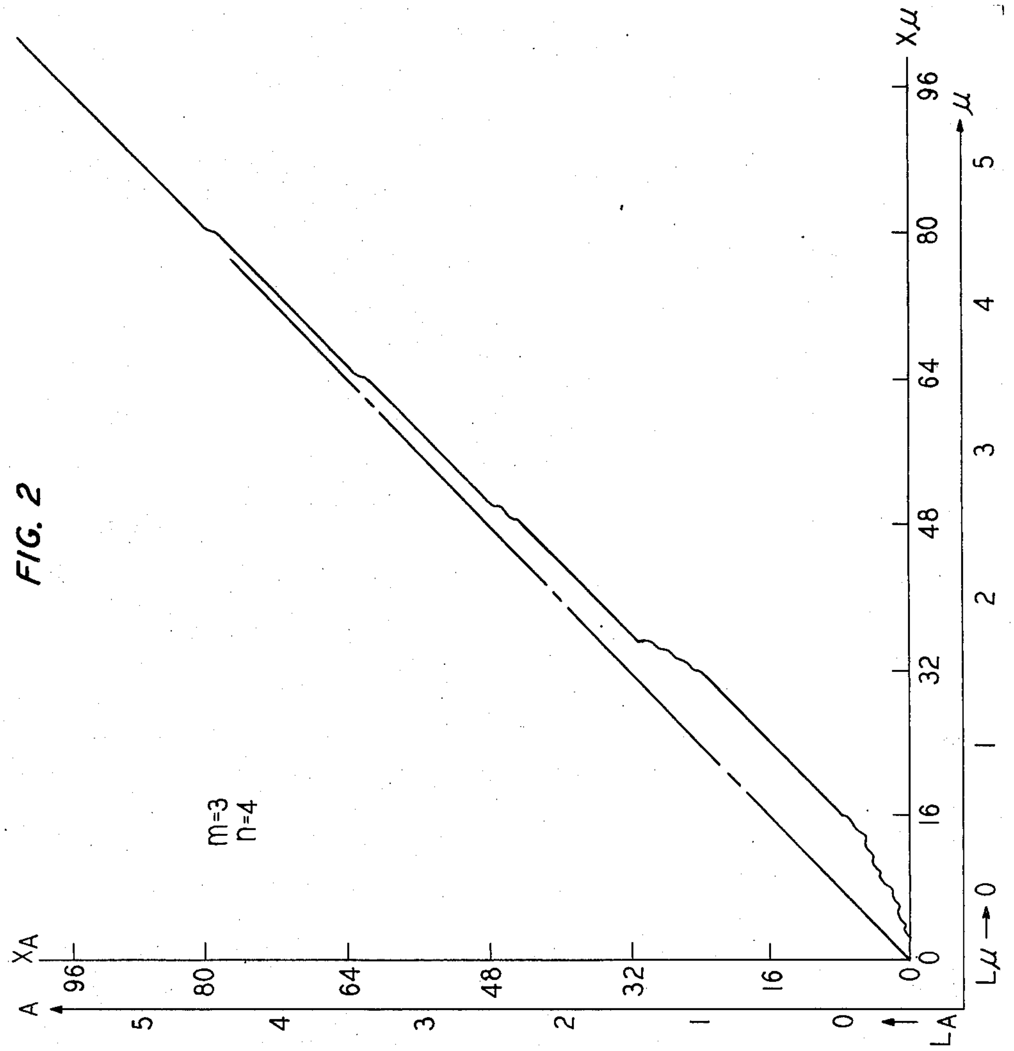
FIG. 2 is a graph illustrating the digital transfer relationship between the compressed $\mu$ Law and A Law codes in accordance with the present invention.

In segmented compressed codes of the type with which the present invention deals, the compressed code X is composed of $m = 3$ binary digits, called "characteristic bits," representing the segment number L, and $n = 4$ binary digits, called "mantissa bits," representing the quantizing step V within a segment. It is to be understood that other values of $m$ and $n$ may be used, those given here being by way of example only.

From the foregoing example, it can be seen that the total number M of segments in one polarity is given by $2^m = 8$, and the total number of quantizing steps N within a segment is $2^n = 16$. The compressed digital signal is then given by $$X(L,V) = V + N \cdot L \qquad (1)$$

or $$V = X \bmod N \qquad (2)$$

where $X$, $L$, and $V$ range over the following values $$X \epsilon (0,1, \ldots 127)$$
$$L \epsilon (0,1, \ldots 7)$$
$$V \epsilon (0,1, \ldots 15) \qquad (3)$$

The digitally linearized (expanded) signal $Y$ is given by $$Y(L,V) = \Delta(L)\,(V+P)-Q \qquad (4)$$

where, for the $\mu$ Law under consideration $$\left.\begin{array}{l} \Delta L = 2^L \\ P = N+a = N+½ \\ a = ½ \\ Q = P \end{array}\right] \qquad (5)$$

and for the A Law $$\left.\begin{array}{l} \Delta L = 1^{L-\eta} \\ P = \eta N+½ \\ Q = 0 \\ \eta = \begin{bmatrix} 0, & L=0 \\ 1, & L\neq 0 \end{bmatrix} \end{array}\right] \qquad (6)$$

where $a$ is the segment edge parameter, representing the transition from one segment to the next.

Figure 1:
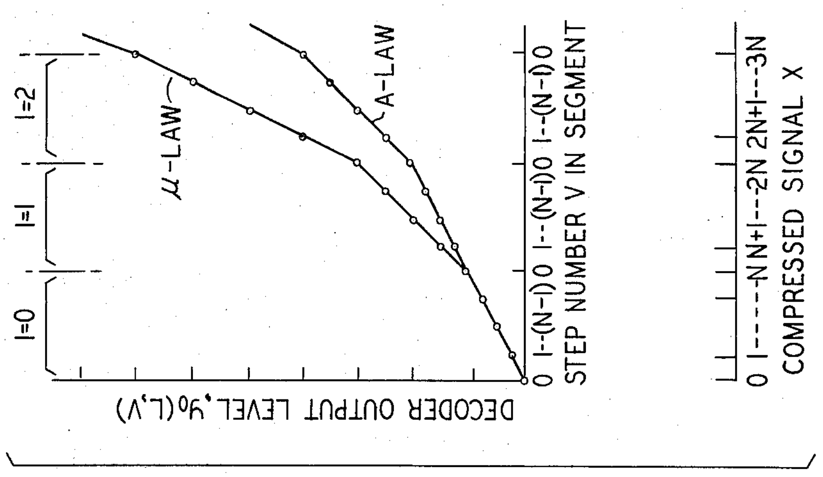
FIG. 1 is a graphic representation of the characteristics of $\mu$ Law and A Law codes, for comparison purposes.

In an article entitled "A Unified Formulation of Segment Companding Laws and Synthesis of Codecs and Digital Compandors" by H. Kaneko, Bell System Technical Journal, Vol. 49, No. 7, (September 1970) pp. 1555–1588, the foregoing is set forth. In FIG. 1 of this application there is shown a graphic representation of the $\mu$ Law and A Law characteristics. FIG. 1 corresponds to FIG. 1 of the aforementioned Kaneko article. It is also shown in that article that the tracking error is zero and the algorithms simplified for $a = ½$.

Using the foregoing notations, and assuming by way of example, that we wish to convert directly from a $\mu$ Law signal $X_1$ to an A Law signal $X_2$, the linearized versions of these signals are, from Equations (4), (5), and (6)

$$Y_1 = 2^{L_1}(V_1 + N+a) - (N+a) \qquad (7)$$

and $$Y_2 = 2^{L_2-\eta_2} \quad (V_2 + \eta_2 N+a) \qquad (8)$$

In the conversion process, it is necessary to determine the values $L_2$ and $V_2$ such that $$Y_2 = HY_1 \qquad (9)$$

where the constant gain $H$ is chosen to match the overload levels in the two codes. For the case at hand, $H = ½$ approximately satisfies this condition and reflects the fact that the step size on the first segment of the $\mu$ Law coder is half that of the A Law coder. Other values of $H$ could be used to give combined attenuation and conversion. Substituting Equations (7) and (8) into Equation (9) yields $$2^{L_2-\eta_2} \quad (V_2 + \eta_2 N+a) = 2^{L_1-1} (V_1 + N+a) - [(N+a)/2] \qquad (10)$$

which may be written $$W(L_2Y_2) = (V_2+\eta_2 N+a) = 2^{\xi+\eta_2-1} \quad [(V_1 + N+a) -2^{-L_1}(N+a)] \qquad (11)$$

where $\xi = L_1-L_2$ and can be shown to take on the values 0 or 1, i.e., $L_2 = L_1$ or $L_2 = L_1-1$. To solve for $V_2$ and $L_2$ (or, equivalently $\xi$) we apply the compression algorithm for the A Law, as given in the aforementioned Kaneko article, which involves finding $L_2$ such that $$W(L_2Y_2) \epsilon [\eta_2 N, (1+\eta_2)N] \qquad (12)$$

or, equivalently $$\eta_2 N \leq W < (1+N_2)N \qquad (13)$$

which yields $L_2$. To find $V_2$, we truncate $W$ (written as $T[W]$) which means discarding its fractional part and then subtract $\eta_2 N$, or $$V_2 = T[W(L_2Y_2)] - \eta_2 N \qquad (14)$$

The foregoing may be made more understandable from the following examples.

EXAMPLE 1

The compressed $\mu$ Law code $X_1$ is given by 0001110. Thus, $L_1 = 0$ and $V_1 = 14$. From Equations (4) and (5), and bearing in mind that the overload levels of the $\mu$ and A Laws have been matched, the output level corresponding to the $X_1$ code is $M_{1/2} = [2^{L_1} (V_1 + N+a) - (N+a)]/2 = 7$. Since $L_2$ is constrained to be equal to or at most one less than $L_1$, $L_2$ is, therefore, zero and hence $\eta_2$ is zero. Therefore, from Equation (11) $W$ is computed to be 7. From Equation (14), $V_2 = 7$ and the output amplitude, from Equations (4) and (6), is $y_2 = 2^{L_2-\eta_2} (V_2 + \eta_2 N + a) = 7.5$. The A Law code $X_2$ is then, 0001110, the same as $X_1$.

EXAMPLE 2

$X_1$ is given as 0001111. $L_1$ is zero and $V_1$ is 15, and $y_{1/2}$ is 7.5. For $L_2 = 0 = \eta_2$, $W$ becomes 7.5 and truncation yields $T[W]= 7$, hence $X_2 = 0001110$, the same as in Example 1.

That two different $X_1$ codes produce the same $X_2$ code is a reflection of the fact that truncation is involved. Using Equations (11), (12), (13) and (14) for each $\mu$ Law code $X_1$, the transfer relationships shown in FIG. 2 can be derived. This figure shows the A Law codes $X_2(X_A)$ corresponding to $X_1(X_\mu)$. The "flats" or wiggles in the characteristic correspond to cases where two values of $X_2$ correspond to one value of $X_1$, and represent noise. For $L_1 > 5$, $X_1 = X_2$. The dash-dot line is the no conversion condition, and it can be seen that for $L_1 > 5$, the two codes are the same.

Implementation of the algorithm given by Equations (12), (13) and (14) in a sequential circuit is facilitated by replacing multiply-by-2 by the operator $z$ which, in addition to multiply-by-2, includes a delay of one clock interval. For L represented by $e_1e_2e_3$ and $V$ by $e_4e_5e_6e_7$, wher $e_r$ is zero or one and $e_7$ is the least significant digit, we have $$V = \sum_{r=4}^{7} e_r Z^{-r} \qquad (15)$$

and $$V(z) = e_r + e_6 z + e_5 z^2 + e_4 z^3 \qquad (16)$$

from Equation (11), and recalling that $N = z^4$, we have $$W(z) = z^{\xi+\eta_2-2} \quad [zV_1(z) + z^5 - z^{5-L_1} + 1 - z^{-L_1}] \qquad (17)$$

$$= z^{\xi+\eta_2-2}\ U(z) \qquad (18)$$

The term $(1-z^{L_1})$ is zero for $L_1 = 0$ and less than one for all other values of $L_1$. Therefore, in the truncation inherent in the compression algorithm, this term makes no contribution and hence may be replaced by zero.

The compression algorithm of Equations (12) and (13) may be interpreted in the form $$\left.\begin{array}{l} W(z)\,|_{t=n} = \eta_2 \\ W(z)\,|_{t>n} = 0 \end{array}\right] \qquad (19)$$

Equations (19) follow from the fact that $W(z)$ is a least significant digit first sequence in which the least significant digit occurs at time $t_0$, the next at $t_1$, and so on. Thus, the digit with the weight $2^n = N$ occurs at $t_n$. Moreover, the correct segment value $L_2$ is achieved as given in Equation (13). When $\eta_2$ is zero, it can be seen from Equation (10), for example, that the coefficient of $z^4 = N$ is zero, which satisfies the criteria of Equations (12), (13) and (19).

Using the shift relationship $$R(z)\,|_{t=k} = z^j R(z)\,|_{t=k+j} \qquad (20)$$

and Equation (18), the compression algorithm Equation (19) may be written as $$\left.\begin{array}{l} U(z)\,|_{t=6-\xi-\eta_2} = \eta_2 \\ U(z)\,|_{t>6-\xi-\eta_2} = 0 \end{array}\right] \qquad (21)$$

In FIG. 3 there is shown a logic table constructed from relationship Equation (21). From FIG. 3 it can be seen that $\xi = 0$ if $U_5 = 1$ or $L_1 = 0$, and 1 otherwise.

In FIG. 4 there is shown a circuit that sequentially implements the algorithm as expressed in Equations (17) and (18), and FIG. 5 is a timing diagram for the operation of the circuit of FIG. 4. In the arrangement of FIG. 4, negative transitions of the clock pulses are utilized to operate the counter and shift register.

At time $t = t_0$, the digits $e_1e_2e_3$ of $L_1$ are applied in parallel to a three cell binary counter circuit 11 through leads 12, 13 and 14 respectively. At the same time, the digits of $V_1$ are applied in parallel to a shift register 16 along with a one in the first stage and a zero in the last stage, (which is the term $1-z^{-L_1}$ discussed heretofore) through leads 17, 18, 19, 21, 22 and 23. Thus at time $t_0$, shift register 16 contains $zV_1(z) + z^5 + 0$.

A clock source 26 causes counter 11 to count up starting at time $t_1$, the clock output being applied to the counter 11 through an AND gate 27. At the same time, shift register 16 is shifted under control of an AND gate 28 supplied with the clock output. The output of counter 11 is applied to an AND gate 29 having three inputs 31, 32, 33, with 32 being inverted, as shown. It can be seen that AND gate 29 will produce an output only when the value of the digits in the counter 11 output is 5, or 101 in binary notation. This occurs at time $t_{5-L_1}$, and is represented by the term $z^{5-L_1}$ in Equation (17). The output of gate 29 is applied to one input 34 of a subtractor circuit 36, whose other input 37 is supplied with the serial output of shift register 16, with the least significant digit first. The output of subtractor 36 is then $zV_1(z) + z^5 - z^{5-L_1}$ which, as given in Equations (17) and (18), is $U(z)$. This output is fed back to a serial input 38 of shift register 16, and to one input of an OR gate 39. The other input of OR gate 39 is supplied with the output of gate 29. The output of OR gate 39 is applied to an inverted input 41 of an AND gate 42. The other input 43 of AND gate 42 is supplied with a pulse $T_5$ commencing at time $t_5$ from a pulse generator 44 controlled by clock 26. The output of AND gate 42 is applied to an inverted input of gate 28 and an inverted input of gate 27. If, during $T_5$, $U_5 = 1$ or $L_1 = 0$, then AND gate 42 is inhibited and gates 27 and 28 are unaffected thereby. This is the equivalent of $\xi = 0$. When there is no output from OR gate 39 at time $T_5$, that is $L_1 \neq 0$ and $U_5 = 0$, then gate 42 produces an output which inhibits both the counter 11 and shift register 28 at $T_5$. In this way the counter 11 has therein, at time $T_8$, $L_2 = L_1 - \xi$, as required.

The output of counter 11 is applied to an AND gate 46, having three inputs 47, 48 and 49, of which 47 is inverted, as shown in FIG. 4. Thus, AND gate produces an output only when the counter 11 output is, in binary form 110, i.e., 6. The output of AND gate 46 is applied to one input 51 of an OR gate 52, whose other input 53 is an inverted input supplied with a pulse from a pulse generator 54 at time period $T_6$ under control of the clock 26. It can be seen that if the output of counter 11 is not 6 at time $T_6$, then there is no output from OR gate 52. As shown in the figure, the output of gate 52 is applied to one input of AND gate 28, hence shift register 16 will skip a shift under control of OR gate 52 only when, at time $T_6$, the output of counter 11 is other than 6. Thus, the shifts on $U(z)$ required by Equation (18) (the shift operator being $z^{\xi+\eta_2-2}$ and the output of OR gate 52 being $\eta_2$) are performed at $t_6$ for $\xi$ and $t_7$ for $\eta_2$. This places $W(z)$ into the proper position of the shift register 16 to satisfy the $V_2$ portion of the compression algorithm as given by Equation (14) where it is available for read out on leads 18, 19, 21 and 22 at time $T_8$, when $L_2$ is also read out on leads 12, 13 and 14. The sign bit has not been treated, since it is the same for both codes.

From the foregoing, it can be seen the $\mu$ Law to A Law conversion is accomplished in a serial or sequential circuit, with the least signfiicant digit being treated first. While the principles and features of the invention have been illustrated in a $\mu$ to A Law conversion, they are applicable to other conversions, with or without attenuation, as well, as will be apparent to workers skilled in the art.

What is claimed is:

1. A digital converter for directly converting an input signal encoded in accordance with a first segment companding law to an output signal encoded in accordance with a second segment companding law, wherein each code comprises a first group of $m$ characteristic digits $e_1e_2$ - - $e_m$ defining the segment L and a second group of $n$ mantissa digits $e_1e_2$ - - $e_n$ defining the quantizing step V in the segment, said converter comprising a source of clock pulses $t$ for producing a counting cycle and means for performing on the input signal $L_1V_1$, under control of the clock pulses, the algorithm $$W(z)=z^{\xi+\eta_2-2}U(z)$$

where $z$ is an operator representing multiplication by two an one clock interval delay, $\xi = L_1 - L_2$ where $L_1$ is the segment term of the input signal and $L_2$ is the segment term of the output signal, $W(z)$ represents the converted signal, $\eta_2 = 0$ when $L_1 = 0$ and 1 when $L_1 \neq 0$, and $U(z)$ is given by $$[zV_1(z)+z^5-z^{5-L_1}+1-z^{-L_1}]$$

where $V_1(z)$ is the mantissa term of the input signal, said means for performing the algorithm comprising a binary counter and a first AND gate having one inhibited input for generating the second term $(z^{5-L_1})$, a shift register for generating the first term $(zV_1(z)+z^5)$, subtractor means for subtracting the second term from the first term to produce $U(z)$, means for applying $U(z)$ to a serial input of said shift register, and means for monitoring the output of said binary counter and the serial input of said shift register to produce a shift in $U(z)$ in accordance with the shift operator $z^{\xi+\eta_2-2}$, said last mentioned means further inhibiting the counting of said binary counter by the term $\xi$ to produce, at the last count of the cycle of said source of clock pulses $(L_2 = L_1-\xi)$ in said counter, and means for extracting the converted signal $L_2V_2$ from said counter and shift register.

2. A digital converter as claimed in claim 1 wherein the means for monitoring comprises a first OR gate having applied thereto the output of said first AND gate and the output of said subtractor means, a second ANd gate having an inverted input to which the output of said first OR gate is applied and an input supplied with a pulse at time period $T_5$ from a first pulse generator controlled by said source of clock pulses, a third AND gate for controlling the shifting of said shift register having one input supplied with pulses from said source of clock pulses and an inverted input supplied with the output from said second AND gate for inhibiting the said shift register from shifting when said second AND gate produces a pulse on its output.

3. A digital converter as claimed in claim 2 wherein the means for monitoring further comprises a fourth AND gate for producing an output only when said binary counter output is 110, the output of said fourth AND gate being applied to one input of a second OR gate, the other input of said second OR gate being an inverted input having the output of a second pulse generator under control of said source of clock pulses applied thereto at time period $T_6$, the output of said second OR gate being applied to a third input of said third AND gate.

4. A digital converter as claimed in claim 2 and further including an AND gate having one input connected to said source of clock pulses and its output connected to said binary counter for controlling the counter and an inverted input connected to the output of said third AND gate for halting the counting of said counter upon the occurrence of a pulse output from said third AND gate.

5. A digital converter for directly converting an input signal encoded in accordance with a first segment companding law to an output signal encoded in accordance with a second companding law, wherein each code comprises a first group of $m$ characteristic digits $e_1e_2$ - - $e_m$ defining the segment L and a second group of $n$ mantissa digits $e_1e_2$ - - $e_n$ defining the quantizing step V in the segment, said converter comprising an $m$ cell binary counter to which the characteristic digits are applied in parallel, a shift register having $n+2$ cells to which the characteristic digits are applied in parallel, a source of clock pulses for producing a timing cycle of $t_1t_2$ - - $t_8$ pulses, the periods between pulses representing time periods $T_1T_2$ - - $T_8$, means for applying the clock pulses to said binary counter to cause it to count for a predetermined number of pulses, a first AND gate having $m$ inputs, at least one of which is inverted, each input being connected to one cell of said binary counter, said first AND gate producing an output upon the occurrence of the time pulse whose number in the cycle corresponds to five minus the original entry in said binary counter, means including a second AND gate for applying clock pulses to said shift register to cause it to produce a sequential pulse output, subtracting means having one input connected to the output of said first AND gate and a second input connected to the output of said shift register for subtracting the output of said first AND gate from the output of said shift register, means for feeding back the output of said subtracting means to a sequential input of said shift register, means for inhibiting the shifting of said shift register for one time period comprising a first OR gate having inputs connected to the outputs of said first AND gate and said subtracting means and its output connected to an inverted input of a third AND gate, means for enabling said third AND gate only during the time period $T_5$, the output of said third AND gate being connected to an inverted input of said second AND gate whereby said shift register is prevented from shifting when said first OR gate produces no output during time period $T_5$, means for inhibiting the action of said counter comprising a fourth AND gate having an inverted output connected to the output of said third AND gate whereby the counter is inhibited for one count when said first OR gate produces no output during the time period $T_5$, and means for extracting in parallel the digital information in said counter and said shift register at the completion of the timing cycle.

6. A digital converter as claimed in claim 5 and further including means for inhibiting the shifting of said shift register during the time period $T_6$ comprising a fifth AND gate having an input connected to each cell of said counter, at least one input being inverted, said fifth AND gate producing an output only when the output of said counter is 110, a second OR gate having one input connected to the output of said fifth AND gate and an inverted input connected to a pulse source under control of said source of clock pulses, which produces a pulse at time period $T_6$, the output of said second OR gate being connected to an input of said second AND gate whereby said shift register is inhibited from shifting when the output of said binary counter is other than 110 during time period $T_6$.

* * * * *